United States Patent [19]

Walters

[11] Patent Number: 5,104,712
[45] Date of Patent: Apr. 14, 1992

[54] SURFACE COVERING MATERIAL

[76] Inventor: Ian D. Walters, Yr Garth, Pentwyn Road, Betws, Ammanford, United Kingdom

[21] Appl. No.: 521,986

[22] Filed: May 11, 1990

[30] Foreign Application Priority Data

Jul. 8, 1989 [GB] United Kingdom ............... 8915714

[51] Int. Cl.$^5$ ............................................. B32B 3/26
[52] U.S. Cl. ................................ 428/95; 428/314.4; 428/316.6; 428/317.1; 428/317.7
[58] Field of Search .............. 428/95, 314.4, 314.8, 428/316.6, 317.1, 317.3, 317.7

[56] References Cited

U.S. PATENT DOCUMENTS

| | | | |
|---|---|---|---|
| 3,975,562 | 8/1976 | Madebach | 428/95 |
| 4,025,372 | 5/1977 | Fenton | 428/317.5 |
| 4,167,824 | 9/1979 | Wolpa | 428/314.8 |
| 4,350,734 | 9/1982 | Hammond | 428/316.6 |

FOREIGN PATENT DOCUMENTS

| | | |
|---|---|---|
| 0023053 | 1/1981 | European Pat. Off. . |
| 2301505 | 7/1973 | Fed. Rep. of Germany ... 428/318.6 |
| 2557719 | 6/1977 | Fed. Rep. of Germany ........ 428/95 |

Primary Examiner—William J. Van Balen
Attorney, Agent, or Firm—Frank D. Gilliam

[57] ABSTRACT

The surface covering material, which is particularly suitable for external uses such as ground or floor covering in golf driving areas, comprises a multi layer structure, which itself comprises (a) an outer layer 1 comprising a preformed fabric 2;
(b) an underlayer 4 comprising a rigid liquid impermeable sheet material bonded to the undersurface of the outer layer by means of an adhesive bonding layer 5; and
(c) a layer 7 of relatively more flexible, hydrophobic closed cell foam, the surface of which is secured directly to the undersurface of the underlayer either by means of a hot melt adhesive or by sintering.

19 Claims, 1 Drawing Sheet

SURFACE COVERING MATERIAL

BACKGROUND OF THE INVENTION

The present invention is concerned with surface covering units and, in particular, textile based surface covering units, which in some embodiments are useful as floor covering or the like and in further embodiments are particularly suitable for outdoor use.

SUMMARY OF THE INVENTION

According to the present invention, there is provided a surface covering unit, which comprises a multi-layer structure comprising:

(a) an outer layer comprising a preformed fabric;
(b) a substantially rigid, liquid-impermeable sheet material bonded to the undersurface of the outer layer by means of an adhesive bonding layer (preferably comprising a hydrophobic hot melt pressure-sensitive adhesive); and
(c) a layer of relatively more flexible, hydrophobic closed cell foam, the surface of which is secured directly to the undersurface of said sheet material.

The multi-layer structure according to the invention may be in the form of tiles or other space-filling shapes. When the surface covering units are intended for floor covering, they may be in the form of room-filling modules (that is, one such unit may cover substantially the entire floor area in a room). The surface covering units may be used for other purposes such as, for example, vehicle floor covering or wall covering. It is preferred that the underlayer and the further layer (in addition to the hot melt pressure-sensitive adhesive), and any further layers present in the surface covering unit according to the invention should all be hydrophobic; in this case, the surface covering units according to the invention are eminently suitable for outdoor use. Among such outdoor uses are as patio covering, swimming pool surrounds, impact absorbent surfacing for areas such as children's playgrounds, covering for golf driving areas (such as "winter tees"), and playing surfaces for games such as bowls, tennis, cricket, football and the like. A preferred use is as surface covering for golf driving areas.

The layer of rigid sheet material present in the surface covering unit according to the invention is typically a closed cell foam, of for example, an olefin polymer or copolymer, such as polyethylene (most preferred) or polypropylene; a further possibility is a polyurethane.

The layer of flexible foam is preferably a hydrophobic, closed cell foam of, for example, polyolefin such as an ethylene copolymer; the latter layer will have a lower density than the previously mentioned rigid layer.

The undersurface of the layer of flexible foam may be placed on a base layer; when such a base layer is used, the base layer may be secured to the foam layer by an adhesive layer, which is preferably of a hydrophobic hot melt pressure-sensitive adhesive. This base layer may be of rigid sheet material; in some embodiments this will substantially enhance the wear resistance of the surface covering unit according to the invention.

The outer layer of the surface covering unit according to the invention may be any suitable preformed (self-supporting) textile fabric, such as a tufted or woven fabric, which may be conventional Wilton or Axminster carpeting material. When the outer layer is patterned, the surface covering units can be laid with good pattern matching between abutting units. The outer layer may have a pile, typically of depth 4 to 13 mm.

The fibres constituting the outer layer are preferably hydrophobic (especially when the surface covering units according to the invention are intended for external use); a preferred example of a suitable hydrophobic material for such an outer layer is polypropylene, which is typically ultraviolet stabilised. Such a material has satisfactory ultraviolet resistance, water-resistance and abrasion resistance for outdoor use.

The adhesive bonding layer is preferably also hydrophobic; the adhesive bonding layer preferably comprises a thermoplastic hot melt pressure-sensitive adhesive polymer, such as a propylene copolymer or a synthetic rubber. Such a hot melt pressure-sensitive adhesive is generally applied in such a way that it surrounds (or encapsulates) a substantial proportion of the individual fibres making up the outer layer (or "bundles", in a woven or tufted fabric); the hot melt pressure-sensitive adhesive bonds the outer layer to the sheet material and in addition enhances the stability of the outer layer.

The hot melt pressure-sensitive adhesive may, contain a biocide (that is, a bactericide of fungicide) typically in an amount of up to 0.1% by weight, based on the weight of the hot melt pressure-sensitive adhesive; such a biocide should, of course, be thermally resistant.

In some embodiments of the invention (such as in the preferred embodiment in which the surface covering unit according to the invention is used for external applications), a series of drainage holes may be punched therein. Such holes may be in random or regular arrays, typically at 50 mm centre separations.

It is particularly preferred that the adhesive should be sprayed, preferably in a molten state, into a space between the upper surface of the sheet material and the undersurface of the outer layer. The layers may then be pressed using one or more rollers (such as pinch rollers) so as to effect lamination and production of the multi-layer structure according to the invention.

In the production of the multi-layer structure according to the invention, it is particularly preferred that the hot melt pressure-sensitive adhesive should be sprayed at a temperature close to its carbonisation temperature (that is, within about 30° C., preferably within 20° C. and sometimes even within 10° C. of the carbonisation temperature), and substantially above the softening point of the fibres or foam layer to which it is applied. Hot melts are not conventionally applied at such high temperatures, and manufacturers instructions invariably suggest that hot melt adhesives should be applied at substantially below the carbonisation temperature thereof. The conventional methods of applying hot melt adhesives (that is, by roller application or dipping) are not preferred because such methods may cause too much heat transfer and therefore the risk of softening the relevant fabric.

Other advantages and features of the present invention will now be described in the following detailed description of preferred embodiments, in which reference is made to the accompanying drawings, wherein:

DETAILED DESCRIPTION OF PREFERRED EMBODIMENTS

Figure 1:
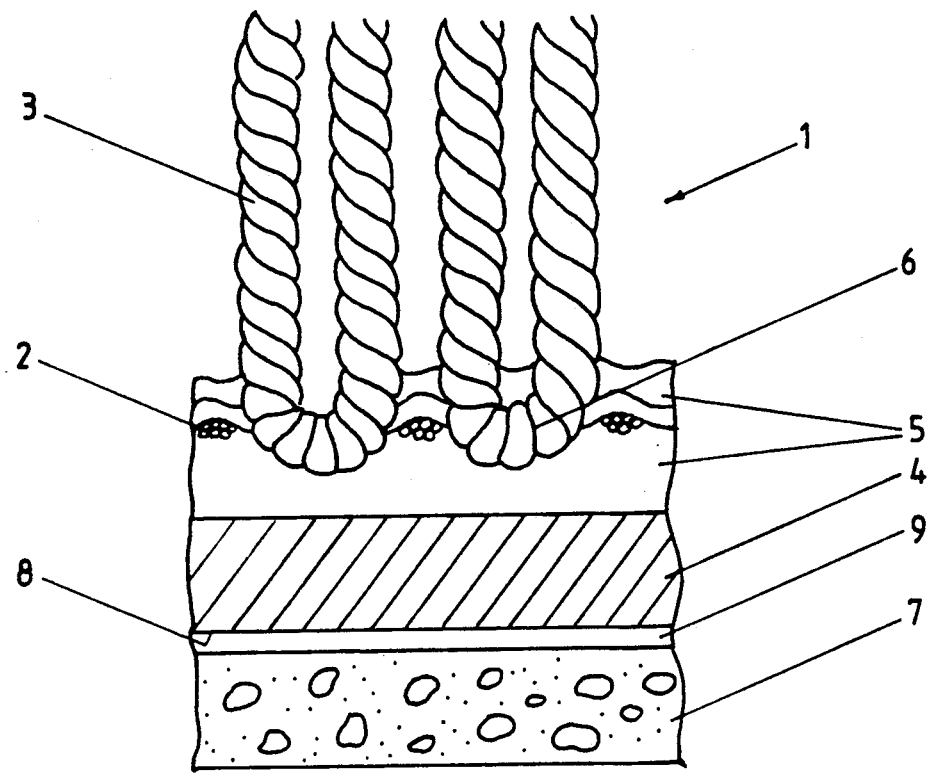
FIG. 1 illustrates (not to scale) a typical layer structure for use as a surface covering unit according to the invention.

Referring to FIG. 1, there is shown a laminate comprising a tufted outer layer 1 comprising a woven base 2 and tufts 3, and an underlayer 4 comprising a rigid, liquid-impermeable sheet material (typically of closed cell foam with small cells). The underlayer 4 and the outer layer 2 are bonded together by means of a continuous layer 5 of hot melt pressure-sensitive adhesive 5 which encapsulates the 'bundle' portion 6 of the tufts 3.

A layer 7 of flexible closed cell foam is secured to the undersurface 8 of underlayer 4 by means of a hot melt pressure-sensitive adhesive 9.

Figure 2:
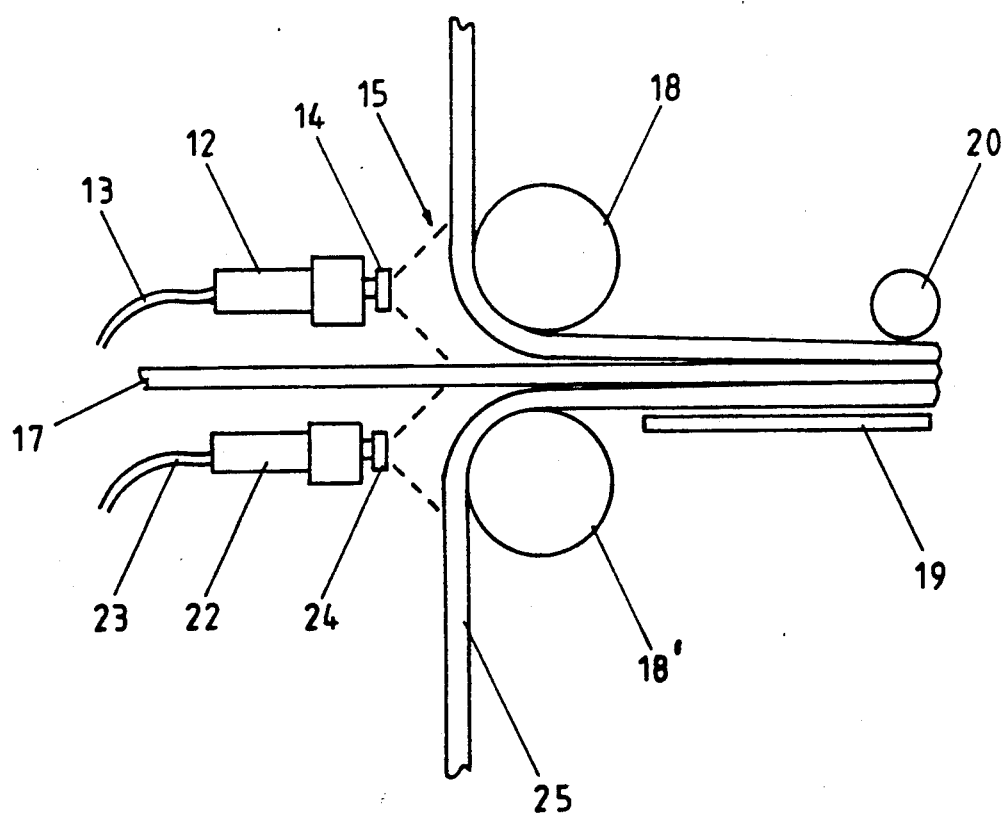
FIG. 2 is a schematic illustration of part of an exemplary production process for a surface covering unit according to the invention.

Referring to FIG. 2, a spray gun 12 has molten adhesive supplied thereto by supply conduit 13; the molten adhesive is sprayed from nozzle 14 to the space 15 between fabric layer 16 and the upper surface of sheet material 17. (Fabric layer 16 constitutes the outer layer and layer 17 the underlayer.) The coated surfaces of layers 16 and 17 are brought into contact using a pair of press rollers 18 and 18′, and then further pressed together using a smaller roll 20 acting against a table 19.

A further spray gun 22 having molten adhesive supplied by supply conduit 23 sprays adhesive from a further nozzle 24 to the space between the lower surface of sheet material 17 and a layer 25 of more flexible closed cell foam.

I claim:

1. A surface covering unit, which comprises a multilayer structure comprising:
   (a) an outer layer comprising a preformed fabric;
   (b) a substantially rigid liquid-impermeable sheet material bonded to the undersurface of the outer layer by means of an adhesive bonding layer; and
   (c) a layer of relatively more flexible, hydrophobic closed cell foam, the surface of which is secured directly to the undersurface of said sheet material.

2. A surface covering unit according to claim 1, in which said adhesive bonding layer is applied to said undersurface of said outer layer by spraying.

3. A surface covering unit according to claim 2, in which said adhesive bonding layer is applied to said undersurface of said outer layer prior to pressing said outer layer to said sheet material.

4. A surface covering unit according to claim 1, in which said outer layer comprises a tufted or woven fabric.

5. A surface covering unit according to claim 1, in which substantially all the individual fibres of said outer layer are hydrophobic.

6. A surface covering unit according to claim 1, wherein said adhesive bonding layer comprises a hydrophobic hot melt pressure-sensitive adhesive.

7. A surface covering unit according to claim 1, wherein said sheet material comprises an olefin polymer.

8. A surface covering unit according to claim 7, wherein said olefin polymer has been peroxide crosslinked.

9. A surface covering unit according to claim 1, wherein said closed cell foam comprises a olefin polymer.

10. A surface covering unit according to claim 1, wherein said closed cell foam layer is secured to the undersurface of said sheet material by sintering.

11. A surface covering unit according to claim 1, wherein said closed cell foam layer is secured to the undersurface of said sheet material by means of an adhesive.

12. A surface covering unit according to claim 11, wherein said adhesive securing the undersurface of said sheet material comprises a hydrophobic hot melt pressure-sensitive adhesive.

13. A surface covering unit according to claim 1, wherein said foam layer is secured to a base layer by means of a hydrophobic hot melt pressure-sensitive adhesive.

14. A method of producing a surface covering unit according to claim 1, wherein a hot melt adhesive is sprayed into a space between the upper surface of the sheet material and the undersurface of the outer layer; and wherein the undersurface of the sheet material and the layer of closed cell foam are bonded to one another.

15. A method according to claim 14, wherein said sheet material and said outer layer are together passed through rollers after application of said hot melt adhesive.

16. A method according to claim 14, wherein said hot melt adhesive is sprayed at a temperature within 30° C. of the carbonisation temperature thereof.

17. A method according to claim 14, wherein said undersurface of the sheet material and said layer of closed cell foam are bonded to one another by spraying a hot melt adhesive into a space between the undersurface of the sheet material and the upper surface of the closed cell foam.

18. A method according to claim 17, wherein said sheet material and said closed cell foam are passed through rollers after application of said hot melt adhesive.

19. A method according to claim 14, wherein said undersurface of the sheet material and said layer of closed cell foam are bonded to one another by sintering.

* * * * *